United States Patent [19]

Arkebauer

[11] Patent Number: 4,657,183
[45] Date of Patent: Apr. 14, 1987

[54] IRRIGATION CONTROL

[76] Inventor: Harry H. Arkebauer, 828 Smith Ave., Ferguson, Mo. 63135

[21] Appl. No.: 800,133

[22] Filed: Nov. 20, 1985

[51] Int. Cl.⁴ ............................................. B05B 12/08
[52] U.S. Cl. ..................................... 239/64; 137/78.3; 137/80
[58] Field of Search ................... 239/63, 64, 67; 137/78.3, 79, 80; 169/19

[56] References Cited

U.S. PATENT DOCUMENTS

| 1,142,824 | 6/1915 | Lund | 137/80 X |
| 2,004,194 | 6/1935 | DeLacy-Mulhall | 137/80 X |
| 2,336,730 | 12/1943 | Hayter | 137/80 |
| 2,675,817 | 4/1954 | Hartlett | 137/80 |
| 3,204,872 | 9/1965 | Whear | 137/78.3 |
| 3,261,125 | 7/1966 | Arkebauer | 137/78.3 X |
| 3,273,579 | 9/1966 | Koculyn | 137/80 |
| 4,095,458 | 6/1978 | Wild | 239/63 X |

Primary Examiner—Andres Kashnikow
Assistant Examiner—Kevin Patrick Weldon
Attorney, Agent, or Firm—Polster, Polster & Lucchesi

[57] ABSTRACT

An automatic irrigation control includes a pilot needle valve with a slidable stem and a block of material the dimensions of which change when exposed to moisture, arranged in a framework so that when the block expands it bears against the valve stem, closing the valve and shutting off a connected hydraulic valve. Preferably, an override lever, connected to a temperature-responsive device, is interposed between the block and the valve in such a way that when the temperature is above a predetermined height, the lever overrides the block and prevents the actuation of the hydraulic valve when the temperature is too high. An adjustable canopy regulates the rate of drying and wetting of the block.

2 Claims, 7 Drawing Figures

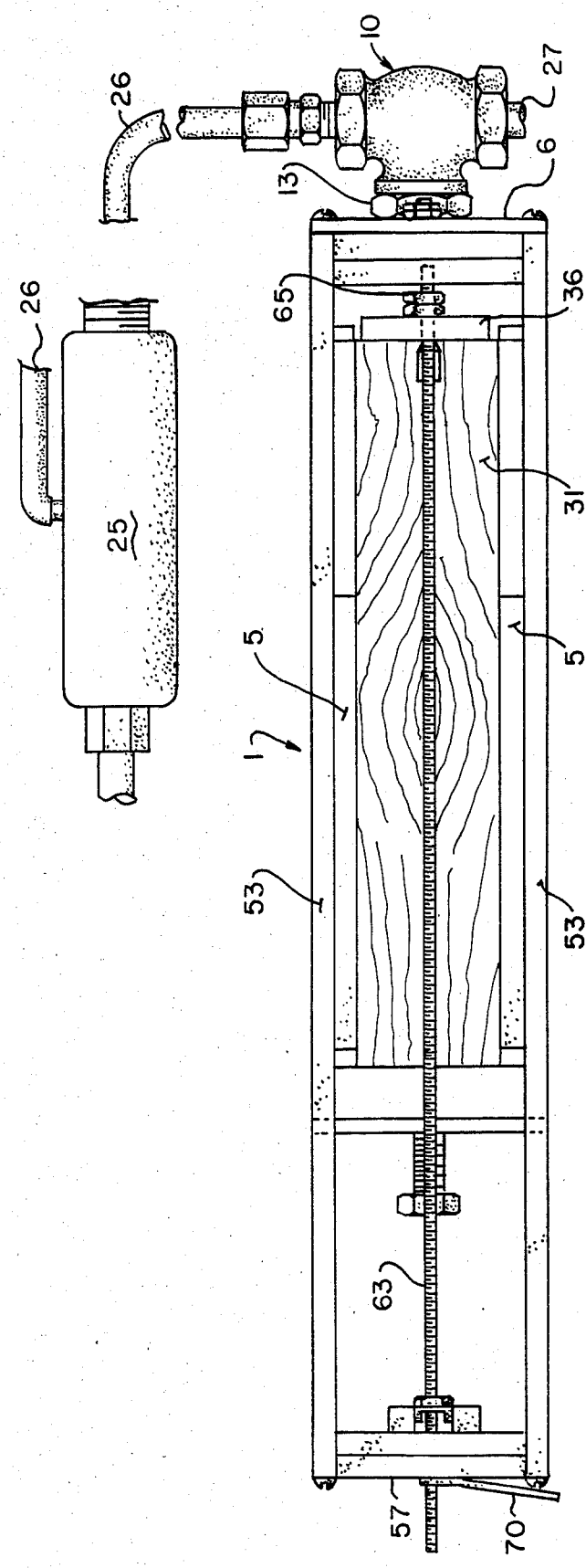
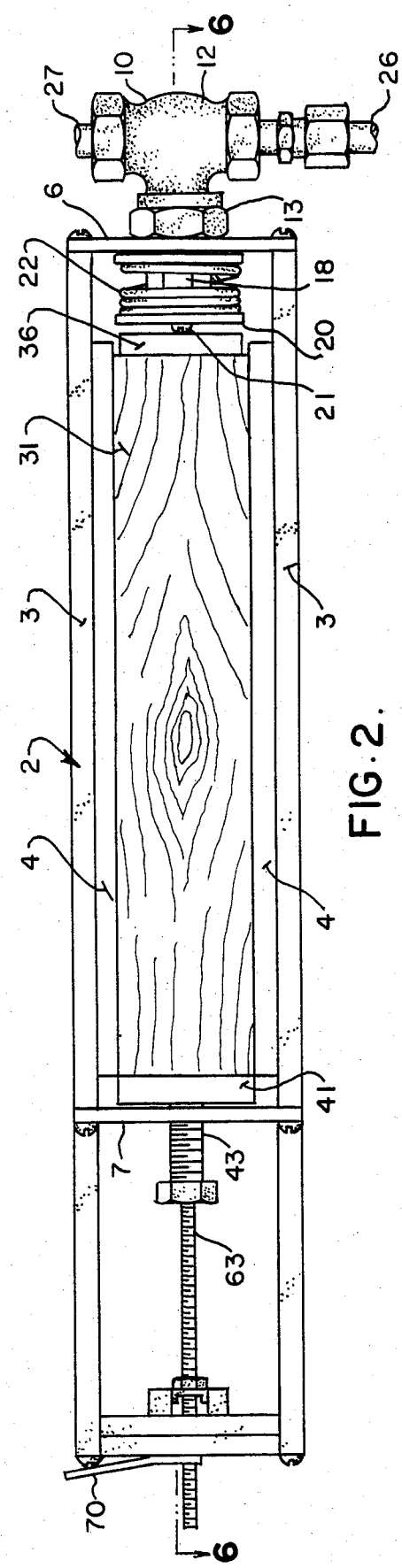

IRRIGATION CONTROL

BACKGROUND OF THE INVENTION

Even in temperate climes, irrigation, whether lawn sprinkling or crop irrigation, is practiced extensively, and in hot and arid climes, is absolutely essential.

At the same time, water is a scarce and, in some places, expensive, natural resource. It is highly desirable to irrigate only when the soil requires it, and to stop when the soil has reached the desired amount of wetness. In those areas in which temperatures reach heights that make overhead irrigation wasteful of water or injurious to plants or both, it is desirable that irrigation not be carried out until the temperature is low enough to avoid those problems.

One of the objects of this invention is to provide automatic control over existing hydraulic irrigation valves, whereby irrigation is begun when the soil has reached a predetermined dryness, and is stopped when the soil has reached a predetermined wetness.

Another object is to provide such a device that is simple to manufacture, easy to use, and requires no external electric power or manual operation, operating on the water pressure available in any event.

Still another object is to provide such a device with an override system that prevents its actuating the irrigation valve when the ambient temperature is too high.

Other objects will become apparent to those skilled in the art of the light of the following description and accompanying drawing.

SUMMARY OF THE INVENTION

In accordance with this invention generally stated, an irrigation control device is provided that includes a pilot valve for actuating a hydraulic valve to turn on and off water in an irrigation system, the pilot valve being responsive to linear movement to open and shut. A moisture responsive block, in the preferred embodiment, a block of redwood with the grain running height-wise of the block, is anchored at one end and operatively connected to the valve at its other end to open and shut the valve in response to its expansion and contraction upon moistening and drying. An adjustable canopy is provided to regulate the amount of drying of the block. Preferably, an override lever, interposed between the block and the valve stem, is connected to a temperature responsive mechanism to hold the valve stem in inoperative position when the ambient temperature is higher than a predetermined temperature.

BRIEF DESCRIPTION OF THE DRAWINGS

In the drawing,

FIG. 1 is a top plan view of one illustrative embodiment of irrigation control device of this invention;

FIG. 2 is a bottom plan view of the device shown in FIG. 1;

DESCRIPTION OF THE PREFERRED EMBODIMENT

Figure 3:
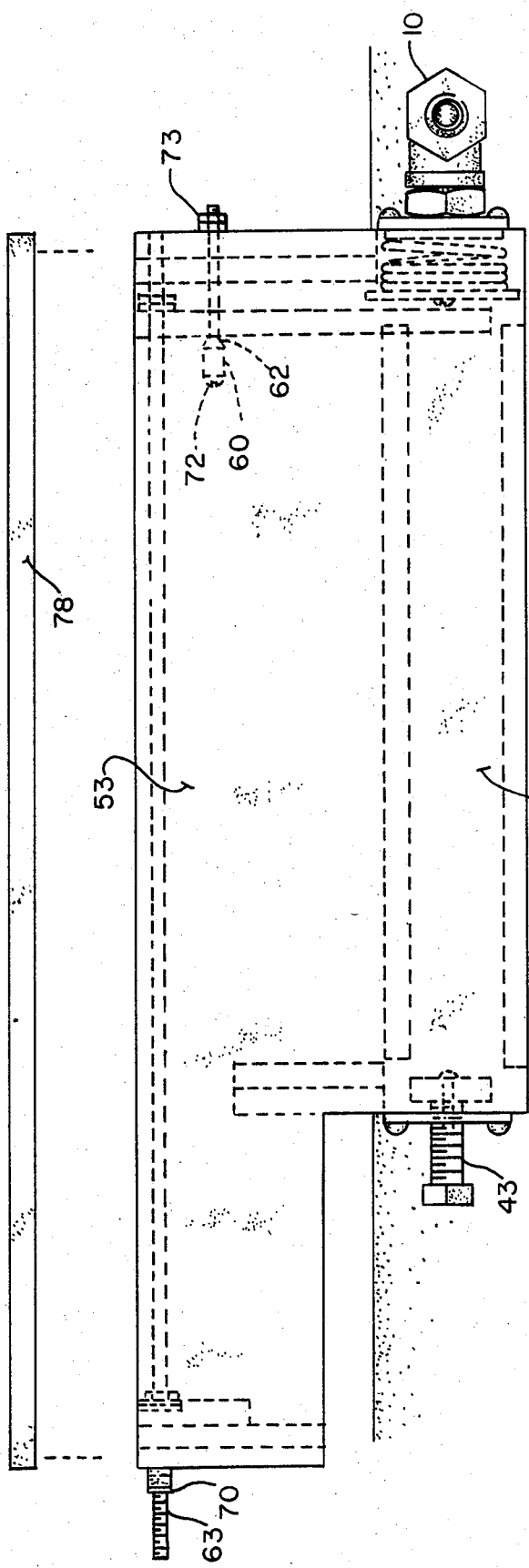
FIG. 3 is a view in side elevation.
Figure 5:
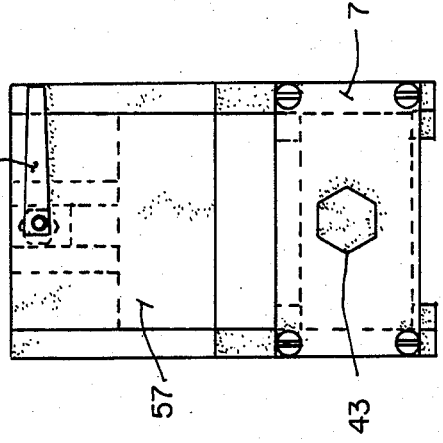
FIG. 5 is a view in end elevation viewed from left to right in FIG. 3 without a canopy.
Figure 4:
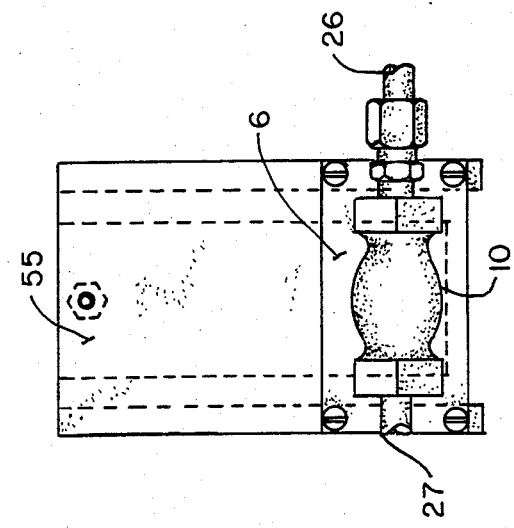
FIG. 4 is a view in end elevation viewed from right to left in FIG. 3.

Referring now to the drawing for one illustrative embodiment of this invention, reference numeral 1 indicates an assembled control device operatively connected to an irrigation valve 25 (see FIG. 1). The device 1 includes a block frame 2 made up of side walls 3, a valve end wall 6 and an adjustment end wall 7. Rails 4, which may be integral with the side walls 3, project inboardly, toward one another, along the lower edges of the side walls, and guide strips 5, spaced above but parallel with rails 4 also project inwardly from the side walls 3.

A pilot valve 10 is mounted on the valve end wall 6 of the block frame. The pilot valve 10 includes a body 12, a bonnet 13, a sliding valve stem 15, and, at the inner end of the valve stem 15, a needle 16, shown particularly in FIG. 6. The needle 16 seats in the usual needle valve seat, the pilot valve 10 being a standard form of needle valve except that the stem 15 is smooth rather than threaded, to permit its sliding. In this embodiment, the bonnet 13 has an externally threaded cylindrical section 14 on which a hexagonal retaining nut 18 is threaded. The section 14 is reduced in diameter with respect to the continuous part of the body, to define a shoulder on the body. The threaded section 14 extends through a hole in the valve end wall 6, and the hex nut 18 is screwed down on the cylindrical threaded section and tightened against the inside surface of the end wall 6 to mount the pilot valve 10 to the end wall 6.

A compression spring 22 is mounted over the hex nut 18, bearing at one end on the inside surface of the end wall 6 and at its other end on a surface of a spring retainer plate 20 mounted on the end of the stem 15 by means of a screw 21, threaded into a tapped hole extending axially into the stem 15.

Figure 6:
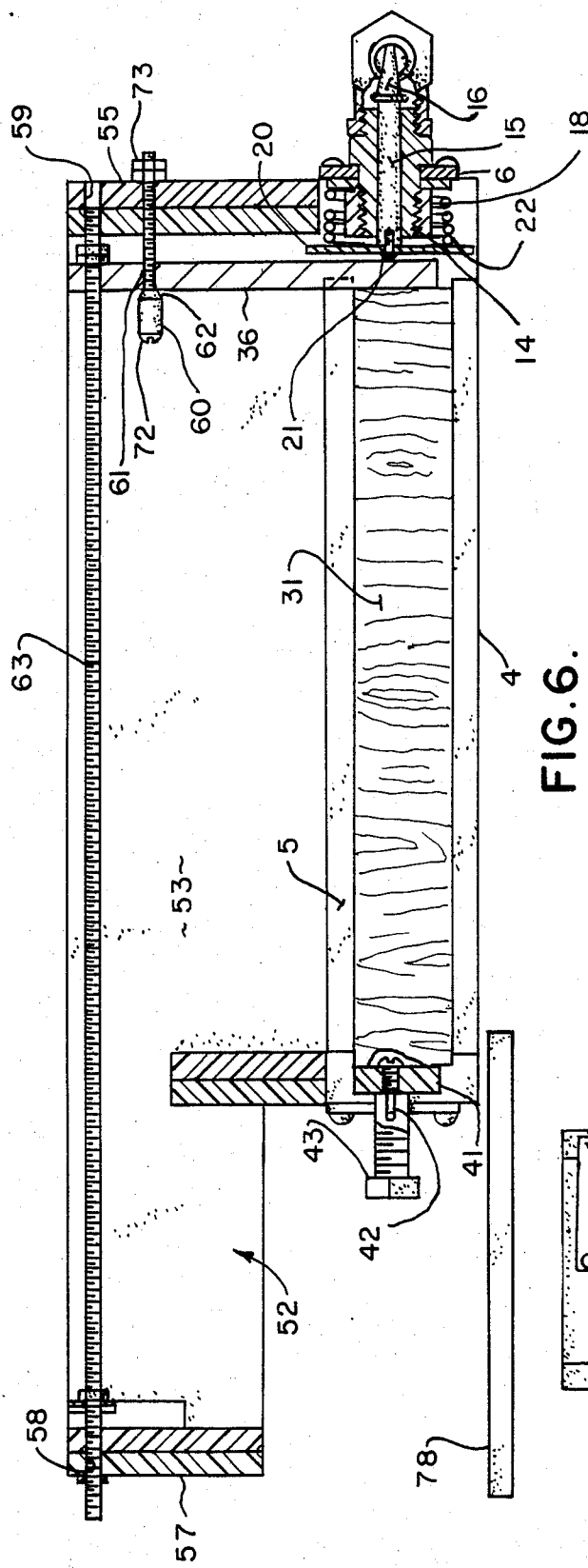
FIG. 6 is a sectional view taken along the line 6—6 of FIG. 2.
Figure 7:
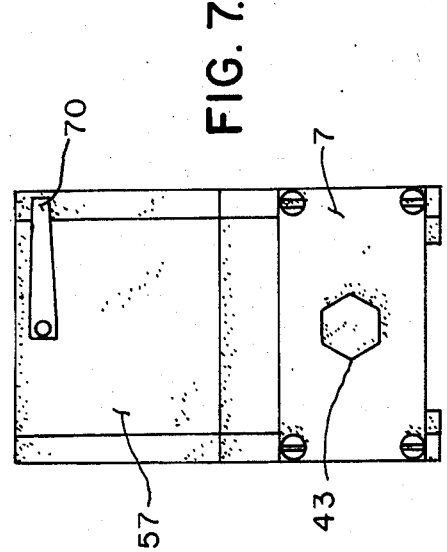
FIG. 7 is a view in end elevation like that of FIG. 5, with a canopy in place.

An elongated, rectangular block 31, which, in the preferred embodiment, is a block of redwood the grain of which runs heightwise as shown in FIG. 6, is mounted between the rails 4 and the guide strips 5. The block 31 is slidable mounted so that it can expand when it is moist and contract when it dries out. At its end remote from the valve, the block has a follower 41 mounted on it by means of a pin 42 extending into the block, through the follower, and, at its outer end, into a hole in the inner end of an adjusting screw 43. The adjusting screw 43 is threaded in an internally threaded hole in the adjustment end wall 7 of the block frame 2. The inner end of the adjusting screw 43 bears against the follower 41, which is made of a material that is hard as compared with the redwood block 31.

In the embodiment shown, a lever 36 is interposed between the end of the block 31 remote from the adjustment end wall and the screw 21 that projects toward the wood block and lever. The lever 36 is, in this embodiment, loosely mounted on a threaded rod 63. The rod 63 is supported by a temperature override frame 52. The temperature override frame includes parallel long side walls 53 which, as shown in FIG. 3, may be integral with the side walls 3 of the block frame 2, a lever end wall 55 and an adjustment end wall 57. The rod 63 extends through and is journaled in a hole 58 in the adjustment end wall 57. The other end of the rod 63 extends into and is journaled in a hole 59 of the lever end wall 55, as best seen in FIG. 6.

A fulcrum sleeve 60 with a frustum 62 engaging the lever 36 is mounted on an adjustable fulcrum screw 61.

The fulcrum screw has a threaded shank with a head 72 at one end engaging a flat end of the fulcrum sleeve 60. The shank extends through a hole in the wall 55 and is threaded into a nut 73, by which the fulcrum point can be moved in and out with respect to the wall 55.

Adjustable stop nuts, threaded on the rod 63, bear against one side of the lever 36 above the fulcrum sleeve 60. On the outboard side of the adjustment end wall 57, a handled adjusting nut 70 is threaded on the rod 63 and screwed down against the outboard side of the adjustment end wall 57.

A canopy 78 is supported above the open upper top of the override frame 52. It is supported by rods, shown diagrammatically in dotted lines in FIG. 3, which can be stuck into the ground or mounted on brackets carried by the override frame 52. The rods provided means for adjusting the space between the top of the frame 52 and the canopy.

A flexible hose or pipe line 26 connects the valve 10 to an irrigation valve 25 that is connected at one end to a sillcock that supplies water under pressure both to it and to the line 26. The other end of the valve 25 communicates with a sprinkler or other irrigation device. Another pipe or hose 27 serves to conduct water released when the valve 10 is open to a place sufficiently removed that it does not wet the block 31. The valve 25 opens in response to relief of pressure in the line 26.

In operation, assuming that the control device 1 is connected to an overhead sprinkler in an area in which the sprinkler ought not to be operated during the heat of the day, the block frame and block are buried in the surface of the ground to a depth at which the soil is to be wetted, but only to a depth at which sunlight and ambient air can reach the top surface of the block, as indicated in FIG. 3. The proper water connections are made to the pilot valve 10 and the irrigation valve 25. If the temperature is above that at which irrigation is desired, the adjusting handle 70 is screwed down until the lever 36 is rocked about the fulcrum sleeve 61 sufficiently to force the needle 16 into its seat, closing the valve 10. In the illustrative embodiment shown, the temperature override frame 52 is made of Plexiglass, and the rod, of stainless steel. The coefficient of expansion of the Plexiglass is so much greater than that of the rod, that, in the heat, it moves the rod to the left as viewed in FIG. 6, to keep the lever against the screw 21, maintaining the pilot valve closed. Assuming that the soil is dry, the block 31 will have shrunk, to move away from the lever 36. When the temperature moderates to the place at which the sides 53 of the frame 52 contract, the lever will be rocked toward the block by the spring 22, which biases the plate 20, hence the stem 15 continuously in a direction away from the valve. This will permit the valve to open and actuate the irrigation valve 25. The block 31 is protected against direct wetting by the overhead sprinkling system by the canopy 78. The watering will continue until the soil in which the block 31 is buried and with which the block is in intimate contact becomes moist enough to permit the block 31 to soak up moisture, expand, and move the lever, hence the stem 15 to the seated position at which the pilot valve 10 is closed, and the irrigation valve 25 turned off.

Unless the block 31 were exposed to the ambient air, it might not dry out fast enough to respond to the need for further irrigation. For this reason, the canopy 78 is made adjustable as far as its height from the frame 52 is concerned. If it is close to the frame, the drying out period is longer than if it is spaced a substantial distance.

When the device is used as an adjunct to ditch type irrigation, the block frame and block can be set into the ground adjacent an irrigation ditch, or even be placed horizontally in the side of the trench at a place at which the trench can be flooded up to the level at which the block is, when the block will turn off the water as has been explained. When the water in the trench has gone down, and the upper side of the block, being exposed to the air and sun, has permitted the block to dry out, it will again turn on the water.

Numerous variations in the construction of the device of this invention, within the scope of the appended claims, will occur to those skilled in the art in the light of the foregoing disclosure. Merely by way of example, the frames can be made of various materials different from Plexiglass or Lucite. The differences in coefficient pf expansion between the frame and the rod can be made greater or less by the use of different materials. Different materials from redwood can be used for the block 31, although redwood with the grain oriented height-wise as viewed in FIG. 6, is quite satisfactory. Additional springs can be interposed between the lever and fulcrum, for example, and between the block and lever, or between the block and the adjusting screw or follower to compensate for excesses in expansion due to temperature or moisture. By moving the block toward and away from the lever 36, by means of the adjusting screw 43, the amount of moisture required to cause the block to expand enough to close the valve can be regulated. Different means for adjustment of the override system and of the block can be provided. These are merely illustrative.

I claim:

1. In an irrigation system in which earth is sprinkled with water falling upon it, a control system comprising a block frame; a needle valve mounted on said frame, said needle valve having a sliding stem projecting from it; biasing means for biasing said stem toward valve opening position; a two ended, elongated block of material that expands as it becomes wet and contracts as it dries, said block having upper and lower broad faces and relatively narrow side and end faces, mounted in said frame, being exposed and in contact, along the full length of its lower broad face, with part of the earth being watered and exposed along its upper broad face to the ambient air; adjustment means at one end of said block for moving said block toward and away from said needle valve; lever means positioned between the other end of said block and said sliding valve stem and operatively connected to said valve stem, said lever having a fulcrum intermediate its ends around which said lever rocks; a rod operatively connected to said lever on the opposite end of said lever, with respect to said fulcrum, from said block and valve stem, and support means for supporting said rod, said support means having a different temperature coefficient of expansion from said rod, whereby heating of said rod and support means causes said lever to rock about its fulcrum to move the valve stem, against its biasing means, to a valve closed position.

2. The control system of claim 1 including a canopy extending over the full length and width of said upper surface of said block, and means for adjusting the position of said canopy with respect to said block.

* * * * *